(12) United States Patent
Nagano

(10) Patent No.: US 7,525,626 B2
(45) Date of Patent: Apr. 28, 2009

(54) LIQUID CRYSTAL DISPLAY AND METHOD FOR MANUFACTURING THE SAME

(75) Inventor: Shingo Nagano, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 103 days.

(21) Appl. No.: 11/748,105

(22) Filed: May 14, 2007

(65) Prior Publication Data

US 2007/0268440 A1  Nov. 22, 2007

(30) Foreign Application Priority Data

May 22, 2006  (JP)  ............................. 2006-141322

(51) Int. Cl.
*G02F 1/1343* (2006.01)
(52) U.S. Cl. .................. 349/141; 349/142; 349/114
(58) Field of Classification Search ................ 349/114, 349/141–142
See application file for complete search history.

(56) References Cited

U.S. PATENT DOCUMENTS

| 6,914,656 B2* | 7/2005 | Sakamoto et al. ........... 349/141 |
| 2003/0218664 A1 | 11/2003 | Sakamoto et al. |
| 2005/0105033 A1 | 5/2005 | Itou et al. |
| 2005/0264730 A1 | 12/2005 | Kataoka et al. |

FOREIGN PATENT DOCUMENTS

| CN | 1704823 A | 12/2005 |
| JP | 2003-344837 | 12/2003 |
| JP | 2005-106967 | 4/2005 |
| KR | 10-2006-0029690 | 4/2006 |
| KR | 10-2006-0030152 | 4/2006 |

OTHER PUBLICATIONS

U.S. Appl. No. 11/748,105, filed May 14, 2007, Nagano.
U.S. Appl. No. 11/767,099, filed Jun. 22, 2007, Ishikawa, et al.
J. H. Song et al., "Electro-optic Characteristics of Fringe-Field Driven Transflective LCD with Dual Cell Gap," IDW/AD'05, LCTp1-3, 2005, pp. 103-106.

* cited by examiner

*Primary Examiner*—David Nelms
*Assistant Examiner*—Phu Vu
(74) *Attorney, Agent, or Firm*—Oblon, Spivak, McClelland, Maier & Neustadt, P.C.

(57) ABSTRACT

A liquid crystal display includes a liquid crystal layer held between an array substrate and an opposing substrate that are placed opposed to each other and a reflector and a transparent regions in one pixel. The array substrate includes a reflective common electrode provided in the reflector region, a reflective common electrode provided in the reflector region for generating an oblique electric field between the reflective pixel electrode, a transparent common electrode provided in the transparent region and a transparent pixel electrode provided in the transparent region for generating a horizontal electric field between the transparent common electrode.

18 Claims, 10 Drawing Sheets

LIQUID CRYSTAL DISPLAY AND METHOD FOR MANUFACTURING THE SAME

BACKGROUND OF THE INVENTION

1. Field of the Invention

The present invention relates to a liquid crystal display and a manufacturing method therefor, and particularly to a liquid crystal display having a reflector and a transparent regions in one pixel and a manufacturing method therefor.

2. Description of Related Art

At the moment a transflective liquid crystal display having a reflector and a transparent regions in one pixel is suggested. In a bright place, the transflective liquid crystal display uses surrounding outside light as a light source. Specifically, the surrounding outside light is reflected by the reflector region that is provided in a pixel to a visible side in order to display. In a dark place, the transflective liquid crystal display mainly uses backlight or the like provided to the backside thereof as a light source. Specifically, light from the backlight passes through to the visible side in the transparent region provided in a pixel. As described in the foregoing, the transflective liquid crystal display is able to display using both the light from the backside light source and surrounding light from outside. This enables to display with high visibility under any kind of surrounding light. Accordingly transflective liquid crystal displays are coming into practice mainly as displays for cellular phones that are used not only inside but also outside.

By the way, many of the transflective liquid crystal displays currently used practically employ ECB (Electrically Controlled Birefringence) that drives homogeneous aligned liquid crystal cells by vertical electric field. On the other hand, transmissive liquid crystal displays employ a wide viewing angle mode such as IPS (In Plane Switching) and VA (Vertical Alignment). Accordingly transflective liquid crystal displays have a problem of narrower field of view as compared to IPS and VA that are widely used as transmissive liquid crystal displays for liquid crystal monitors and liquid crystal display televisions.

Therefore a technique to achieve a wide viewing angle in a transflective liquid crystal display is disclosed in Japanese Unexamined Patent Application Publication No. 2003-344837 and Japanese Unexamined Patent Application Publication No. 2005-106967. In these documents, IPS, one of the display modes of horizontal electric field drive system achieving a wide viewing angle, is used. Further, as a drive system other than IPS system, a liquid crystal display using FFS (Fringe Field Switching) is also disclosed.

In Japanese Unexamined Patent Application Publication No. 2003-344837, comb-like pixel electrodes and common electrodes disposed alternately are formed to drive liquid crystal by horizontal electric field. Further, a reflector plate is placed under a part of the pixel and common electrodes with an insulating film interposed therebetween. The region having the reflector plate placed thereon is referred to as a reflector region, while the region not having the reflector plate placed thereon is referred to as a transparent region. Accordingly in the reflector region, light controlled by horizontal electric field driven liquid crystal is reflected by the reflector plate and output to the visible side. On the other hand, in the transparent region, light from the backlight is controlled by horizontal electric field driven liquid crystal and output to the visible side.

In Japanese Unexamined Patent Application Publication No. 2005-106967, comb-like pixel electrodes and common electrodes disposed alternately are formed to drive liquid crystal by horizontal electric field. Further, the pixel and common electrodes are formed of metallic materials that reflect light. Accordingly in a reflective display, light controlled by liquid crystal molecules on the pixel electrode is used. In a transparent display as in a conventional technique, light controlled by horizontal electric field between the comb-like electrodes is used.

The principle of operation for FFS mode used in IDW/AD' 05 (LCTp1-3 and p103-106) is briefly described hereinafter. Generally in FFS mode, a pixel electrode is placed above a common electrode. An insulating film is placed between the common and pixel electrodes. Further, the pixel electrodes are processed in slits. A fringe electric field in oblique direction is generated between an edge portion of the slit side of the pixel electrode and the common electrode. Liquid crystal molecules are driven using the fringe electric field so as to display. In the technique disclosed in IDW/AD' 05 (LCTp1-3 and p103-106), a part of the common electrode is formed of a transparent conductive film, while the remaining is formed of a reflective conductive film. This realizes a transflective liquid crystal display having a reflector and a transparent regions in one pixel.

However in the transflective liquid crystal displays disclosed in IDW/AD' 05 (LCTp1-3 and p103-106), there are following problems. For example in the configuration disclosed in Japanese Unexamined Patent Application Publication No. 2003-344837, the reflector plate is generally formed by Al alloy with high reflectivity. Therefore, there is a problem that the reflector plate brings a bad influence between comb-like pixel and common electrodes. Specifically, liquid crystal driving electric field between comb electrodes is influenced by the reflector plate that is placed in a lower layer. Thus it is difficult to control the liquid crystal molecules in the reflector region, thereby making it difficult to achieve a favorable display quality.

In the configuration disclosed in Japanese Unexamined Patent Application Publication No. 2005-106967, comb electrodes are used as a reflector region. On the comb electrodes, it is hard for liquid crystal molecules to move by the electric field between the comb electrodes. Accordingly to achieve a favorable reflective characteristic, the comb electrode must be processed three-dimensionally. Thus more processes are required and difficult technique is required. Further, the number of processes for manufacturing increase, thereby lowering productivity.

In the configuration disclosed in IDW/AD' 05 (LCTp1-3 and p103-106), a transparent region is formed in a pixel. Thus it is required to form two layers of common and pixel electrodes with a transparent conductive film. Moreover, to form a reflector region in a pixel, a reflector plate must be added to a part of the common electrode. Therefore, the number of manufacturing processes is increased as compared to an array manufacturing process of a common transflective liquid crystal display. Thus the productivity is reduced. As described in the foregoing, in a conventional liquid crystal display, there is a problem that it is difficult to accomplish a liquid crystal display having a favorable display quality.

SUMMARY OF THE INVENTION

The present invention is made in view of the aforementioned problems, and an object of the present invention is to provide a liquid crystal display having a favorable display quality and a method of manufacturing the same.

According to a first aspect of the present invention, there is provided a liquid crystal display that includes a liquid crystal layer held between a first and a second substrate, the first and the second substrate being placed opposite to each other, and a reflector region and a transparent region in one pixel. The first substrate includes a comb-like transparent common electrode provided in the transparent region, a comb-like transparent pixel electrode placed opposed in parallel to the transparent common electrode and for generating a horizontal direction electric field between the transparent common electrode in the transparent region, a reflective common electrode provided in the reflector region and a reflective pixel electrode provided in the reflector region and placed opposed to the reflective common electrode with an insulating film interposed therebetween. Between the reflective common electrode and the reflective pixel electrode, a slit is formed in the electrode provided to an upper layer, and an oblique electric field is generated between the reflective common electrode and reflective pixel electrode by the slit.

The present invention provides a liquid crystal display having a favorable display quality and a method of manufacturing the same.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

First Embodiment

Figure 1:
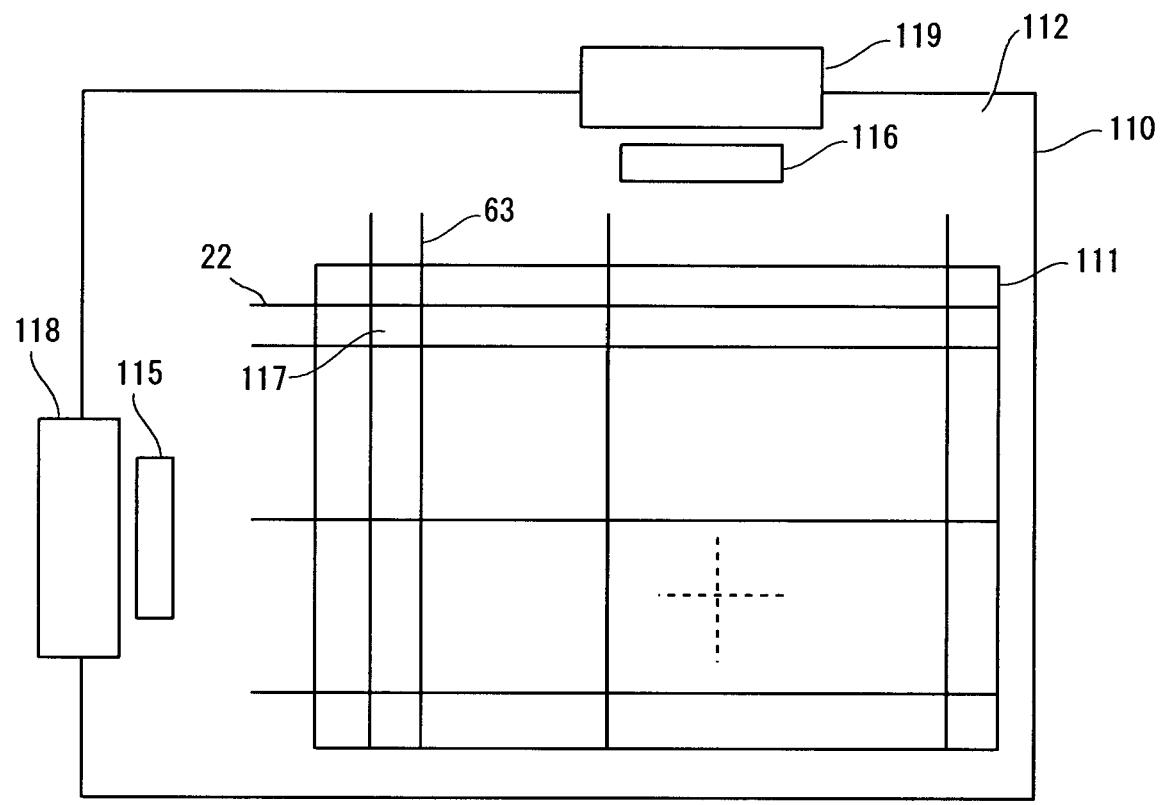
FIG. 1 is a plan view schematically showing a configuration of a TFT array substrate of a liquid crystal display according to a first embodiment of the present invention.

A liquid crystal display according to a first embodiment of the present invention is described hereinafter in detail with reference to FIG. 1. FIG. 1 is a front view showing a configuration of an array substrate 110 used in the liquid crystal display of this embodiment. The liquid crystal display of this embodiment is a transflective liquid crystal display having a liquid crystal display panel including a reflector and a transparent regions.

The liquid crystal display of this embodiment includes the array substrate 110. The array substrate 110 is an array substrate such as a thin film transistor array substrate (hereinafter referred to as a TFT array substrate). A display region 111 and a frame region 112 surrounding the display region 111 are provided in the array substrate 110. In the display region 111, a plurality of gate lines (scanning signal line) 22 and a plurality of source lines (display signal line) 63 are formed. The plurality of gate lines 22 are provided in parallel. Likewise, the plurality of source lines 63 are provided in parallel. The gate lines 22 and the source lines 22 are formed to cross each other. The gate lines 22 and the source lines 63 are orthogonal to each other. Further, a region surrounded by adjacent gate line 22 and the source line 63 is a pixel 117. Accordingly the pixels 117 are arranged in matrix in the array substrate 110.

Further, in the frame region 12 of the array substrate 110, a scanning signal drive circuit 115 and a display signal drive circuit 116 are formed. The gate line 22 extends from the display region 111 to the frame region 112. Further, the gate line 22 is connected with the scanning signal drive circuit 115 at the edge of the array substrate 110. Likewise, the source line 63 extends from the display region 111 to the frame region 112. Further, the source line 63 is connected with the display signal drive circuit 116 at the edge of the array substrate 110. An external line 118 is connected near the scanning signal drive circuit 115. Further, an external line 119 is connected near the display signal drive circuit 116. The external lines 118 and 119 are constituted by wiring board such as FPC (Flexible Printed Circuit).

Various signals are externally supplied through the external lines 118 and 119 to the scanning signal drive circuit 115 and the display signal drive circuit 116. In accordance with an external control signal, the scanning signal drive circuit 115 supplies a gate signal (scanning signal) to the gate line 22. In response to the gate signal, the gate lines 22 are selected one by one. The display signal drive circuit 116 supplies a display signal to the source line 63 based on an external control signal and display data. Thus, a display voltage corresponding to the display data can be applied to each pixel 117. Incidentally, the scanning signal drive circuit 115 and the display signal drive circuit 116 are not necessarily formed over the array substrate 110. For example, the drive circuits may be connected by TCP (Tape Carrier Package).

As for a liquid crystal display, other than the gate line 22 and the source line 63, an auxiliary capacity line for forming an auxiliary capacity is formed. As with the gate line 22 and the source line 63, the auxiliary capacity line also extends from the display region 111 to the frame region 112. Thus, an external common potential can be applied to the pixel 117.

At least one thin film transistor (TFT) is formed in the pixel 117. The TFT is placed near the crossing point of the source line 63 and the gate line 22. The TFT for example applies the display voltage to a pixel electrode. Specifically, in response to the gate signal from the gate line 22, the TFT, a switching device, is turned on. Thus, the display voltage is applied to a pixel electrode connected to a drain electrode of the TFT from the source line 63. Further, an electric field corresponding to the display voltage is generated between the pixel and common electrodes. The configuration of the pixel and common electrodes are described later in detail. Incidentally, an alignment film (not shown) is formed over the surface of the array substrate 110.

Further, an opposing substrate is placed opposed to the TFT array substrate. The opposing substrate is for example a color filter substrate that is placed on the visible side. A color filter, a black matrix (BM) and an alignment film or the like are formed over the opposing substrate. Furthermore, a liquid crystal layer is held between the array substrate 110 and the opposing substrate. Specifically, liquid crystal is filled between the array substrate 110 and the opposing substrate. Moreover, a polarizing plate and a retardation plate or the like are provided to the outside surface of the array substrate 110 and the opposing substrate. Further a backlight unit or the like is provided to a non-visible side of the liquid crystal display panel.

The liquid crystal is driven by the electric field between the pixel and common electrodes and an alignment direction of the liquid crystal between the substrates changes. This changes the polarization state of the light that passes through the liquid crystal layer. That is, the light passed through the polarization plate to become a linear polarization changes its polarization state by the retardation plate and liquid crystal layer. To be more specific, in the transparent region, the light from the backlight becomes a linear polarization by the polarization plate provided to the TFT array substrate side. Then the polarization state changes by the linear polarization passing through the retardation plate on the TFT array substrate side, liquid crystal layer and the retardation plate on the opposing substrate side. On the other hand, in the reflector region, the outside light entered from the visible side of the liquid crystal display panel becomes a linear polarization by the polarization plate of the opposing substrate side. By the light going and returning between the retardation plate on the opposing substrate side and liquid crystal layer, the polarization state changes.

The amount of light passing through the polarizing plate on the opposing substrate changes according to the polarization state. Specifically, among the transmitted light transmitting the liquid crystal display panel from the backlight unit and the reflected light reflected by the liquid crystal display panel, the amount of light passing through the polarizing plate on the visible side changes. The alignment direction of the liquid crystal changes according to the display voltage applied. Accordingly by controlling the display voltage, the amount of light passing through the polarizing plate on the visible side can be changed. That is, by changing the display voltage for each pixel, a desired image can be displayed.

To be more specific, in order to display black, the light is made to be a linear polarization having the almost same oscillation direction (plane of polarization) as an absorption axis of the polarizing plate on the visible side by the retardation plate and liquid crystal layer. This enables to block most of the light by the polarizing plate on the visible side so as to display black. On the other hand, to display white, the light is made to be a linear polarization in the direction to be almost orthogonal with the absorption axis of the polarizing plate on the visible side or a circular polarization etc. This enables the light to pass through the polarization plate on the visible side so as to display white. As set forth above, the display voltage applied to each pixel is controlled by the gate and source signals. Thus the alignment of the liquid crystal layer changes and the polarization state changes according to the display voltage. Thus a desired image can be displayed.

Figure 2:
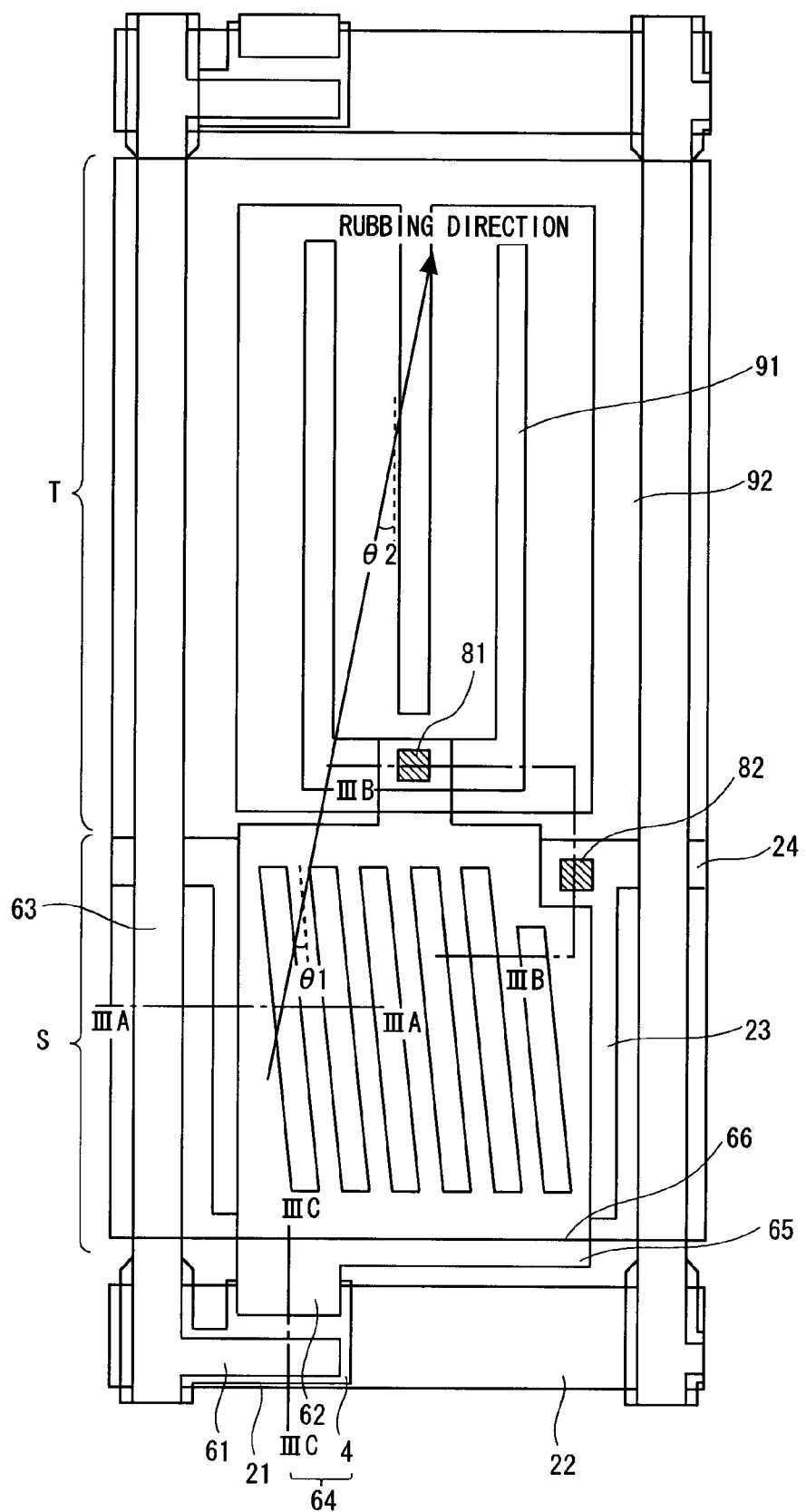
FIG. 2 is a plan view schematically showing a pixel configuration of the TFT according to the first embodiment of the present invention.
Figure 3:
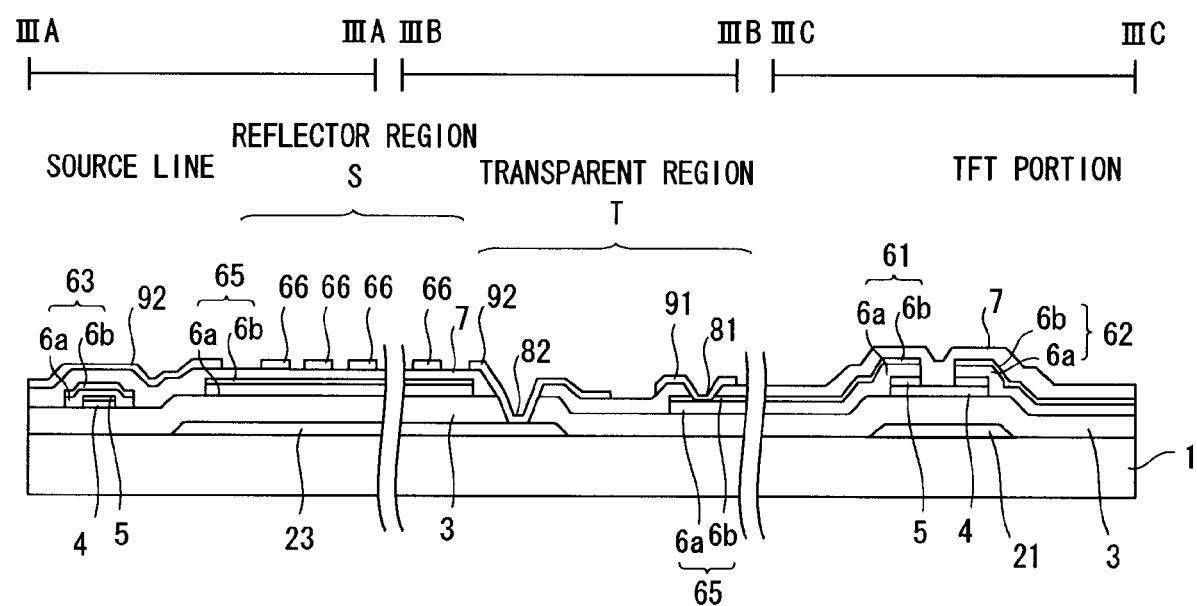
FIG. 3 is a cross-sectional diagram of FIG. 2.

A pixel structure of a liquid crystal display of this embodiment is described hereinafter in detail with reference to FIGS. 2 and 3. FIG. 2 is a plan view showing a pixel configuration provided to the array substrate 110 of the liquid crystal display. FIG. 3 is a cross-sectional diagram showing configurations taken along the lines IIIA-IIIA, IIIB-IIIB and IIIC-IIIC of FIG. 2. Here, the line IIIA-IIIA indicates the configuration of the source line portions, the line IIIB-IIIB indicates the configuration from a reflector region S to a transparent region T, the line IIIC-IIIC indicates the configuration of TFT portion. Note that FIG. 3 shows the configurations of the source line portion, reflector region S, transparent region T and TFT portion from the left.

As shown in FIG. 2, pixels are placed surrounded by the gate line 22 and the source line 63. The display region 111 is formed by arranging these pixels in matrix. Each of the pixels includes a transparent region T and a reflector region S. Specifically, the liquid crystal display of this embodiment is a transflective liquid crystal display having the reflector region S and the transparent region T in one pixel.

The substrate 1 is for example a transparent glass substrate. The gate line 22 having the gate electrode 21 is provided over the substrate 1. Further, the auxiliary capacity line 24 having an auxiliary capacity electrode 23 is formed over the substrate 1. The auxiliary capacity line 24 and the gate line 22 are provided almost in parallel. In FIG. 1, the auxiliary capacity line 24 and the gate line 22 are formed horizontally in the same direction. Furthermore, the auxiliary capacity electrode 23 extends from the auxiliary capacity line 24. A voltage can be retained by the auxiliary capacity electrode 23 for a given period of time. That is, a retention volume is formed by the auxiliary capacity electrode 23.

Moreover, the auxiliary capacity line 24 is placed between adjacent two gate lines 22. More specifically, same number of the gate line 22 and the auxiliary capacity lines 24 are prepared and alternately placed. The gate electrode 21, gate line 22, auxiliary capacity electrode 23 and auxiliary capacity line 24 are formed of a first conductive film. As the gate electrode 21, gate line 22, auxiliary capacity electrode 23 and auxiliary capacity line 24 are formed of the same conductive film, they practically have the same material and same film thickness. The gate electrode 21, gate line 22, auxiliary capacity electrode 23 and auxiliary capacity line 24 are formed by patterning the first conductive film.

Moreover, a first insulating film 3 is formed over the gate electrode 21, gate line 22, auxiliary capacity electrode 23 and the auxiliary capacity line 24. The first insulating film 3 is formed to cover the gate electrode 21, gate line 22, auxiliary capacity electrode 23 and the auxiliary capacity line 24. In the TFT portion, the first insulating film 3 is to be the gate insulating film. Further a semiconductor active film 4 and an ohmic contact film 5 are formed over the first insulating film 3. The semiconductor active film 4 and the ohmic contact film 5 are placed in the TFT portion. That is, the semiconductor active film 4 and the ohmic contact film 5 are formed over the gate electrode 21. The ohmic contact film 5 is formed over the semiconductor active film 4.

Here, in the TFT portion, the central portion of the ohmic contact film 5 is removed. Accordingly the ohmic contact film 5 is divided into two regions. One of the two regions is a source region of the TFT, and the other is a drain region. Thus a source electrode 61 is formed over one of the two regions, and a drain electrode 62 is formed over the other region. Specifically, the ohmic contact film 5 is formed over the source and drain regions of the semiconductor active film 4. Note that the source electrode 61 and the drain electrode 62 are formed of a second conductive film. Further the second conductive film is formed by laminating two layers of metallic films, for example. Accordingly the source electrode 61, source line 63 and drain electrode 62 are formed by a first layer 6a and a second layer 6b, as shown in FIG. 3.

The source line 63 having the source electrode 61 is formed over the substrate 1. The source line 63 is placed to be orthogonal to the gate line 22 with the first insulating film 3 interposed therebetween. Further, a region surrounded by the adjacent gate line 22 and source line 63 is a pixel. The source electrode 61 extends from the source line 63. The semiconductor active film 4 and ohmic contact film 5 remain in the crossing portion of the lines and a part of the source line 63 with an aim to improve electrostatic withstand voltage. The second insulating film 7 is formed over the source electrode 61, drain electrode 62 and source line 63. The second insulating film 7 is placed to cover the source electrode 61, drain electrode 62 and source line 63.

The reflector region S is described hereinafter in detail. The reflector region S displays in FFS (Fringe Field Switching) mode. The reflector region S is formed closer to the TFT than the transparent region T. Specifically, the reflector region S is placed between the TFT and the transparent region T of the pixel. A reflective pixel electrode 65 is formed in the reflector region S. The reflective pixel electrode 65 extends from the drain electrode 62. The reflective pixel electrode 65 is formed of the second conductive film. Accordingly the reflective pixel electrode 65 is also formed by the first layer 6a and the second layer 6b. The reflective pixel electrode 65 is formed over the auxiliary capacity electrode 23. Specifically, the reflective pixel electrode 65 and the auxiliary capacity electrode 23 are placed in a way that at least a part of the electrodes overlaps with the first insulating film 3 interposed therebetween. In other words, the reflective pixel electrode 65 and auxiliary capacity electrode 23 are placed opposite to each other across the first insulating film 3. Further the overlapped portion of the reflective pixel electrode 65 and the auxiliary capacity electrode 23 is to be the retention volume for a given period of time. Incidentally, the reflective pixel electrode 65 has a metallic film having a high reflectivity at least on its surface. Therefore a metallic thin film such as Al or the like can be used for the surface layer of the second conductive film. Thus for the second layer 6b, a metallic thin film containing Al is used.

The reflective pixel electrode 65 is placed between the adjacent source lines 63. Here, the reflective pixel electrode 65 is placed leaving a predetermined interval from the source lines 63. For example, the space between the reflective pixel electrode 65 and the source line 63 can be 3 μm to 10 μm. Thus the reflective pixel electrode 65 is placed almost all over the reflector region S excluding the gap between the source line 63 and the reflective pixel electrode 65.

The second insulating film 7 is formed over the reflective pixel electrode 65. The second insulating film 7 is placed to cover the reflective pixel electrode 65. Further, a reflective common electrode 66 is formed over the second insulating film 7. More specifically, the reflective common electrode 66 and the reflective pixel electrode 65 are placed opposite to each other across the second insulating film 7. The reflective common electrode 66 is formed of the third conductive film.

The reflective common electrode 66 is processed in slits so as to generate an oblique electric field with the reflective pixel electrode 65. In other words, a plurality of striped openings is formed leaving predetermined intervals in the reflective common electrode 66. The plurality of openings is to be the slits. The slits causes to generate an oblique electric field between the reflective common electrode 66 and the reflective pixel electrode 65 therebelow. The width of the slits, which is the width of the openings, may be 3 μm to 6 μm, for example. The direction of each slit is parallel to each other, tilting from the direction of the line. In FIG. 2, 6 slits are formed. The reflective common electrode 66 is formed to be larger than the reflective pixel electrode 65. Thus most part of the reflective common electrode 66 overlaps the reflective pixel electrode 65 with the second insulating film 7 interposed therebetween. In other words, the reflective common electrode 66 and the reflective pixel electrode 65 are placed opposite to each other with the second insulating film 7 interposed therebetween.

Further the reflective common electrode 66 overlaps most part of the source line 63 with the second insulating film 7 interposed therebetween. That is, the reflective common electrode 66 extends to outside the pixel, so that the reflective common electrode 66 overlaps the source line 63 provided to both side of the pixel with the second insulating film 7 interposed therebetween. This enables to effectively shield the electric field from the source line 63. As set forth above, in the reflector region S, an electric field for driving liquid crystal is generated by the reflective pixel electrode 65 and the reflective common electrode 66 that are composed of different conductive layers. As the slits are provided in the reflective common electrode 66, oblique electric field is generated to a face of the substrate 1. Thus the transparent region T is able to display in FFS mode.

The direction of each slits is tilted from the gate line 22 and source line 63. That is, the direction of the slits is between the direction of the gate line 22 and that of the source line 63. An angle made by the slit and rubbing directions is θ1. Each of the slits are provided in the same direction. The reflective pixel electrode 65 is formed below the slits. By the slits formed in the reflective common electrode 66, an oblique electric field can easily be generated. As set forth above, as the reflective pixel electrode 65 and reflective common electrode 66 are formed with different layers, an electric field oblique to a film thickness direction is generated. Thus the electric field generated in the reflector region S is in the oblique direction to the substrate 1 surface. The liquid crystal is driven according to the oblique electric field.

The transparent region T is described hereinafter in detail. Here, the transparent region T displays in IPS (In Plane Switching) mode. In the transparent region T, the transparent pixel electrode 91 is formed. The transparent pixel electrode 91 is formed of the third conductive film. The transparent pixel electrode 91 is formed over the first insulating film 3 and the second insulating film 7. Further, the transparent pixel electrode 91 is connected with the reflective pixel electrode 65 via a contact hole 81 provided in the second insulating film 7. That is, the reflective pixel electrode 65 comprised of the second conductive film and the transparent pixel electrode 91 comprised of the third conductive film are provided so that a part of the electrodes overlaps. To be more specific, a part of the reflective pixel electrode 65 extends to the transparent region T. In the extended portion, a part of the second insulating film 7 is removed. Thus in the overlapped portion, the contact hole 81 is formed. The transparent pixel electrode 91 is formed over the contact hole 81. Thus the transparent pixel electrode 91 and reflective pixel electrode 65 are connected via the contact hole 81. Accordingly the transparent pixel electrode 91 and reflective pixel electrode 65 become the same electric potential by the display voltage. As set forth above, the transparent pixel electrode 91 is connected with the TFT via the reflective pixel electrode 65.

Moreover in the transparent region T, a transparent common electrode 92 formed by the third conductive film is formed. The transparent common electrode 92 extends from the reflective common electrode 66. That is, the transparent common electrode 92 and reflective common electrode 66 are formed integrally. The transparent pixel electrode 91 and transparent common electrode 92 are respectively formed in comb-shape. In other words, the transparent pixel electrode 91 and transparent common electrode 92 have a plurality of comb electrodes. Further, the comb electrodes of the transparent pixel electrode 91 and the comb electrodes of the transparent common electrode 92 are placed leaving predetermined intervals. The comb electrodes of the transparent pixel electrode 91 and the comb electrodes of the transparent common electrode 92 are placed alternately. Specifically, the comb electrodes of the transparent pixel electrode 91 and the comb electrodes of the transparent common electrode 92 are placed opposed to each other in a parallel direction to the substrate 1 surface. This causes to generate electric fields in a parallel direction to the substrate 1 between the transparent pixel electrode 91 and transparent common electrode 92.

Here, in a common electrode comprised of the transparent common pixel 92 and the reflective common electrode 66, openings corresponding to the transparent region T are provided. To be more specific, the transparent common electrode 92 is formed in a frame shape so as to surround the transparent region T. In other words, the opening in the common electrode is the transparent region T. Further in the transparent region T, comb electrodes extend toward the direction of the source line 63 from frame-like transparent common electrode 92.

As set forth above, in the transparent region T, an electric field for driving liquid crystal is generated by the transparent pixel electrode 91 and transparent common electrode 92 that are formed by the same third conductive film. The liquid crystal is driven by the electric field that is in parallel direction to the substrate 1 surface. That is, it is possible to display in IPS mode. The transparent common electrode 92 overlaps most part of the source 63 with the second insulating film 7 interposed therebetween. Specifically, the transparent common electrode 92 extends to come out of a pixel so as to overlap with the source line 63 provided to both sides of the pixel with the second insulating film 7 interposed therebetween. This enables to effectively shield the electric field from the source line 63.

In FIG. 2, the transparent pixel electrode 91 is comprised of two comb electrodes. The two comb electrodes are arranged side by side in the direction of the gate line 22. Further, a comb electrode constituting the transparent common electrode 92 is provided between the two comb electrodes constituting the transparent pixel electrode 91. Each of the comb electrodes are provided in parallel to the source lien 63. The transparent common electrode 92 is patterned to surround outside the two comb electrodes constituting the transparent pixel electrode 91. The transparent pixel electrode 91 and transparent common electrode 92 are placed leaving predetermined intervals in the direction of the gate line 22. As set forth above, by placing comb-like transparent pixel electrode 91 and comb-like transparent common electrode 92 opposed to each other in parallel, a horizontal electric field is generated in the direction of the gate line 22. Note that the angle made by the comb electrode and rubbing directions is θ2.

The transparent common electrode 92 and the reflective common electrode 66 are connected with the auxiliary capacity electrode 23 or auxiliary capacity lien 24 in a pixel. That is, the reflective common electrode 66 or transparent common electrode 92 is provided overlapping with a part of the auxiliary capacity electrode 23. Furthermore in the overlapped portion, the first insulating film 3 and second insulating film 7 are removed. Thus a contact hole 82 is formed in the overlapped portion. In the portion for forming the contact hole 82, the reflective pixel electrode 65 formed of the second conductivity film is not provided. In this case, in the portion for forming the contact hole 82, the reflective pixel electrode 65 is removed. That is, a notch is created to form a contact hole in corner portions of the reflective pixel electrode 65. Therefore among the six slits, one slit provided in the notch portion is shorter than the other slits.

The transparent common electrode 92 and reflective common electrode 66 formed by the third conductive film above the second insulating film 7 are connected with the auxiliary capacity electrode 23 via the contact hole 82. Thus a common potential is provided to the transparent common electrode 92 and reflective common electrode 66 via the auxiliary capacity line 24. Therefore, the common potential can be stably provided to the reflective common electrode 66 and transparent common electrode 92. A transparent conductive film such as ITO can be used for the third conductive film. Thus, the light efficiency can be improved. Needless to say that a metallic film or the like other than a transparent conductive film may be used for the third conductive film.

The pixel electrode comprised of the reflective pixel electrode 65 and transparent pixel electrode 91 and the common electrode comprised of the reflective common electrode 66 and transparent common electrode 91 are formed in one pixel. Further in the transparent region T, the transparent pixel electrode 91 and transparent common electrode 92 are formed by the same conductive layer. In the reflector region S, the reflective pixel electrode 65 and reflective common electrode 66 are formed by different conductive layers. Here, the transparent common electrode 92 and reflective common electrode 66 are formed by the same conductive layer. Specifically, by extending the reflective common electrode 66 to the transparent region T, the transparent common electrode 92 is formed. At this time the transparent common electrode 92 is comb shape. Further, the common potential is provided to the transparent common electrode 92 and reflective common electrode 66 from the auxiliary capacity electrode 23 which has the same conductive layer as the gate line 22. At this time, the common potential is provided to the transparent common electrode 92 and reflective common electrode 66 via the contact hole 82 provided in the insulating film from the auxiliary capacity electrode 23. That is, the common potential from the auxiliary capacity line 24 is provided to the reflective common electrode 66 via the contact hole 82.

The transparent pixel electrode 91 and reflective pixel electrode 65 are formed by different conductive layers. The transparent common electrode 92 is in comb-shape. Further the reflective pixel electrode 65 and transparent pixel electrode 91 are electrically connected via the contact hole 81 provided in the insulating film. The transparent pixel electrode 91 is electrically connected with the TFT, which is a switching device, via the reflective pixel electrode 65. With this configuration, an electric field for driving liquid crystal is generated in horizontal direction in the transparent region T, while in the reflector region S, an oblique electric field is generated. Therefore the reflector region S and the transparent region T can be different operation modes. Thus it is possible to improve the view angle and also display quality.

A manufacturing method of the liquid crystal display of this embodiment is described hereinafter in detail with reference to FIGS. 4 and 5. FIG. 4 is a process cross-sectional diagrams showing the manufacturing method for the TFT array substrate used in the liquid crystal display of this embodiment. FIG. 5 is a plan view showing the manufacturing process.

Firstly, a transparent insulating substrate 1 is prepared. Then the substrate 1 is washed to clean its surface. After that, the first conductive film is formed over the substrate 1. The first conductive film can be formed by sputtering, for example. For the material of the first conductive film, chromium (Cr), molybdenum (Mo), tantalum (Ta), titanium (Ti) or aluminum (Al) can be used. Alternatively an alloy primary comprises any of these may be used. Furthermore, a laminated film of these materials may be used. In this embodiment, a Cr film having a film thickness of 400 nm is used for the first conductive film.

The contact hole 82 is formed above the first conductive film by a process described later. In the contact hole 82, a conductive thin film for obtaining an electric connection is formed. Therefore for the first conductive film, a metallic thin film that rarely generates an oxidization on its surface or a metallic thin film that still has conductivity even with oxidized surface are desired. If using an Al-based material for the first conductive film, an Al nitride film may be formed on the surface. Alternatively, a thin film of Cr, Mo, Ta or Ti may be formed over the first conductive film. This prevents from deteriorating the conductivity by the oxidization of the surface.

Figure 4A:
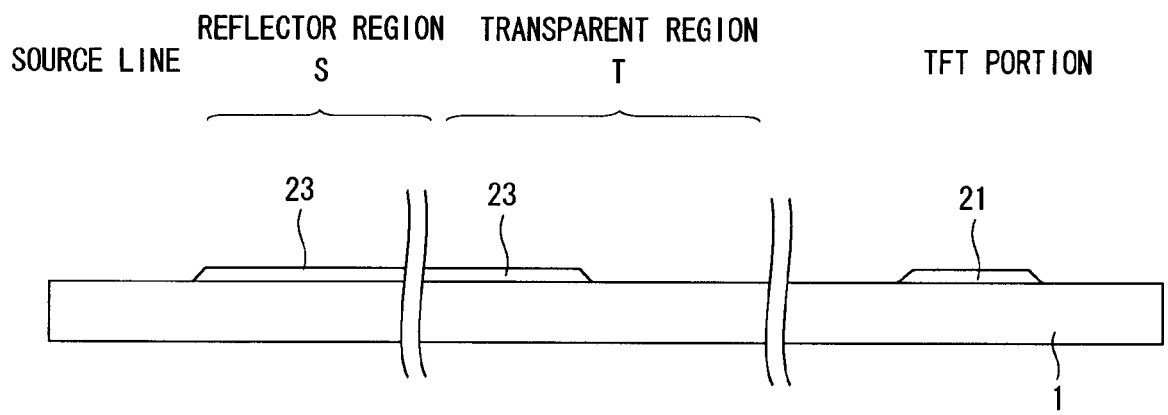
FIGS. 4A to 4D are process cross-sectional diagrams showing a manufacturing process of a TFT array substrate according to a first embodiment of the present invention.
Figure 4B:
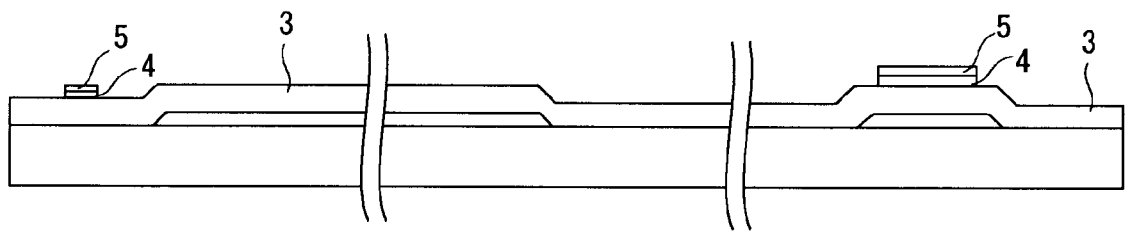
Figure 4C:
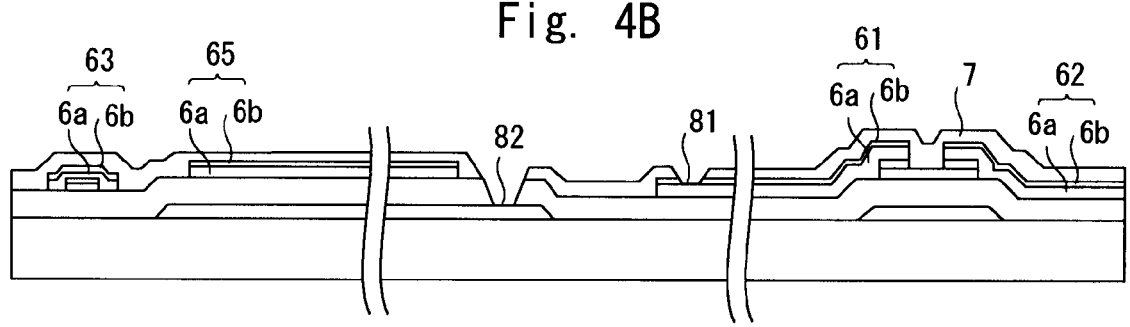
Figure 4D:
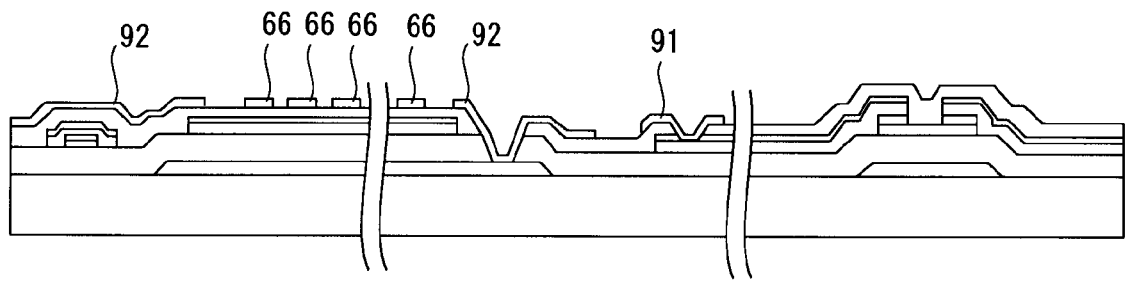
Figure 5A:
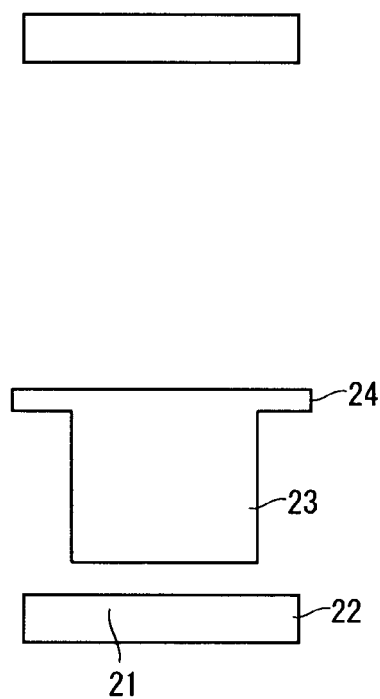
FIGS. 5A to 5D are plan views illustrating a manufacturing process of a TFT array substrate according to a first embodiment of the present invention.
Figure 5B:
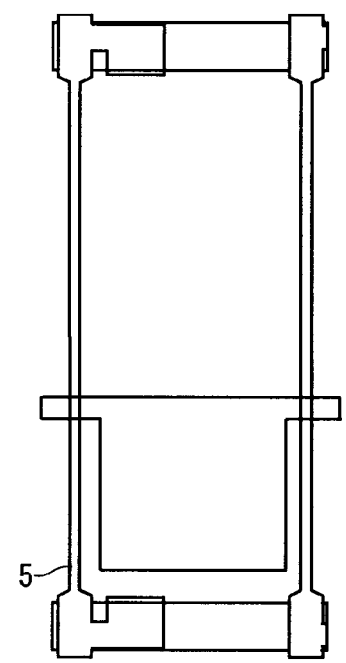
Figure 5C:
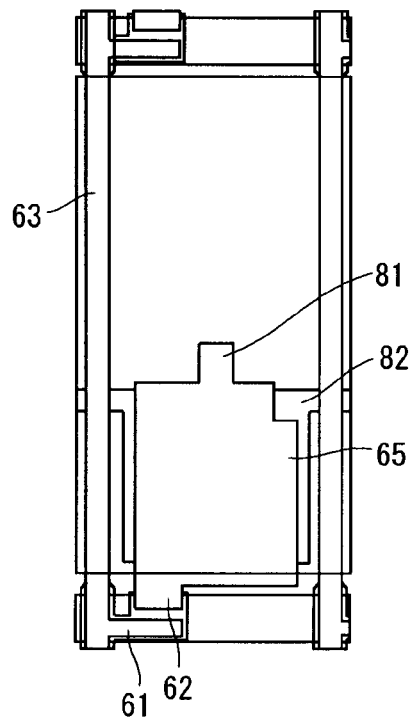
Figure 5D:
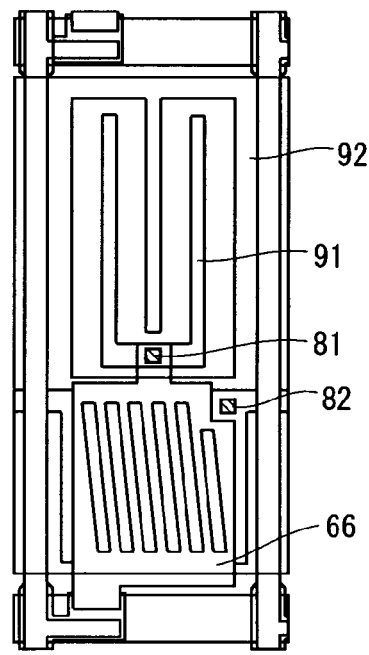

Next, the first conductive film is patterned by a first photomechanical process. This forms the gate electrode 21, gate line 22, auxiliary capacity electrode 23 and auxiliary capacity line 24 as shown in FIGS. 4A and 5A. The auxiliary capacity electrode 23 is formed in the reflector region S so that a part of the auxiliary capacity electrode 23 overlaps with the reflective common electrode 65 that is described later in detail. In the photomechanical process, the substrate 1 having the first conductive film formed thereon is washed, for example. After washing, a photosensitive resist is coated and dried over the first conductive film. Then the photosensitive resist is exposed through a photo mask having a specified pattern formed thereon and developed. Thus a photosensitive resist having a mask pattern transcribed thereon can be formed on the first conductive film of the substrate 1. After hardening the photosensitive resist, the first conductive film is etched. That is, an etching is performed through the photosensitive resist having the pattern transcribed thereon. This enables to etch the first conductive film according to the mask pattern. After the etching, the resist is removed to become as in FIGS. 4A and 5A.

Note that the etching of the first conductive film may be performed by a wet etching. A known etchant may be used for an etchant. For example, if the first conductive film is Cr, aqueous solution mixed with nitric acid and Cerium Diammonium Nitrate can be used. When etching the first conductive film, it is desired to etch the cross-sectional face of the pattern edge to be trapezoid tapered. This improves a coverage of the insulating film in bumps of the pattern edge. Therefore, it is possible to prevent a short-circuit in bumps of other lines or conductive films.

Then the first insulating film 3 to be the gate insulating film and a silicon film to be the semiconductor active film 4 and ohmic contact film 5 are consecutively formed. Then the silicon film is patterned by a second photomechanical process. Then the configuration becomes the ones shown in FIGS. 4B and 5B. The semiconductor active film 4 and ohmic contact film 5 are patterned to remain at least in the TFT portion. Further, the semiconductor active film 4 and ohmic contact film 5 remain in a portion in which the gate line 22 and source line 63 cross and the portion in which the source 63 is formed. This increases electrostatic withstand voltage. Note that the semiconductor active film 4 and ohmic contact film 5 are etched by a dry etching using a known gas composition. For example as an etching gas, mixed gas of $SF_6$ and $O_2$ or mixed gas of $CF_4$ and $O_2$ may be used.

In this embodiment, a single layer film made of one of $SiN_x$, $SiO_y$ and $SiO_zN_w$ or a laminated film made thereof can be used as the first insulating film 3 (note that x, y, z and w are positive numbers indicating stoichiometry). To prevent interlayer short-out due to the generation of pin hole or the like, the first insulating film 3 is preferably formed over several times. The first insulating film 3 is the gate insulating film in the TFT portion. In this embodiment, after forming a SiN film having a film thickness of 300 nm, the first insulating film 3 is formed by forming a SiN film having a film thickness of 100 nm. Thus the first insulating film 3 is a SiN film having a film thickness of 400 nm.

For the semiconductor active film 4, an amorphous silicon (a-Si) film or a polysilicon (p-Si) film or the like may be used. If the semiconductor active film 4 is made too thin, the film may be lost at a dry etching of the ohmic contact film 5, which is described later. On the other hand if the semiconductor active film 4 is too thick, ON current of the TFT becomes small. Accordingly the film thickness of the semiconductor active film 4 can be determined in consideration over the controllability at the dry etching of the ohmic contact film 5 and necessary ON current value of the TFT. In this embodiment, an a-Si film having a film thickness of 150 nm is formed as the semiconductor active film 4.

For the ohmic contact film 5, an n-type a-Si film doped with phosphorus (P) in an a-Si film may be used. Alternatively, an n-type p-Si film doped with phosphorus (P) in a p-Si film may be used as the ohmic contact film 5. In this embodiment, an n-type a-Si film having a film thickness of 30 nm is used as the ohmic contact film 5.

Next, the second conductive film is formed by a sputtering method or the like. The second conductive film is laminated structure comprising the first layer 6a and the second layer 6b. For the first layer 6a of the second conductive film, Cr, Mo, Ta, Ti or an alloy mainly comprising these materials may be used. For the second layer 6b, Al, silver (Ag) or an alloy mainly comprising these materials may be used. The first layer 6a is formed on the ohmic contact film 5 to directly contact the ohmic contact film 5. The second layer 6b is formed on the first layer 6a to directly contact the first layer 6a. As the second conductive film is used as the source line 63, a thin film having a low resistance is desired in light of the wiring resistance. Further, as the second conductive film is used as the reflective pixel electrode 65, a thin film having a high reflective characteristic in the surface layer is desired. In this embodiment, a Cr film having a film thickness of 100 nm is used for the first layer 6a, while an AlCu film having a film thickness of 300 nm is used for the second layer 6b Then the second conductive film is patterned by a third photomechanical process. Then the source line 63 having the source electrode 61 and the reflective pixel electrode 65 having the drain electrode 62 are formed. As the drain electrode 62 and reflective pixel electrode 65 are formed by the same second conductive film, they are electrically connected in the same film. That is, the drain electrode 62 and reflective pixel electrode 65 are formed integrally. Accordingly the drain electrode 62 and reflective pixel electrode 65 are substantially formed with the same thickness and by same material.

In the third photomechanical process, a halftone exposure or the like may be used to expose the first layer 6a. A process of the halftone exposure is described hereinafter. In the half tone exposure, a halftone mask having different density in the chromium film for the photo mask is used, for example. The intensity of the exposure can be adjusted by exposing through the halftone mask. This enables to control the remaining film thickness of the resist film after being developed. For example for the halftone exposure, a halftone mask is used so that the resist film in the portion to expose the first layer 6a to be thin. Then after the development, the film in the portion where the resist film is completely removed is etched. This enables to etch the second conductive film and the source electrode 61, drain electrode 62, source line 63 and reflective pixel electrode 65 are formed as described above.

Next, after etching the second conductive film, the resist film is reduced using oxygen plasma or the like. Then the resist film in which the remaining film thickness is thin after the development is removed. After that the film in the resist film portion removed by reducing the film thickness is etched. At this time, in the film portion remained with thick film, the resist film still remains and the film is not removed. This removes only the second layer 6b and the first layer 6a is exposed. Specifically, only the second layer 6b removed by a wet etching through the resist film having the reduced film thickness. This exposes the first layer 6a in the portion corresponding to the contact hole 81 that connects the reflective pixel electrode 65 and transparent pixel electrode 91. At this time, in the portion to remain the second layer 6b, a thin resist film remains even after reducing the film thickness. On the other hand, the resist film on the portion to expose the first layer 6a is removed. Accordingly it is possible to pattern for two processes by one photomechanical process.

This exposes the first layer 6a. Therefore, a favorable contact resistance with the third conductive film formed by the transparent conductive film can be obtained. Thus in the contact area, the first layer 6a that is formed by Cr is exposed. Accordingly the contact having a favorable conductivity can be obtained. Then, the ohmic contact film 5 in the channel region is dry etched. This exposes the semiconductor active film 4 in the channel region.

If Al nitride alloy (AlCuN) or the like is formed on the surface of the second conductive film, the reflectivity is slightly reduced but a favorable contact can be obtained with the third conductive film that is formed by the transparent conductive film. In this case, the process to form the contact area can be skipped.

The exposure process to expose the first layer 6a is not limited to the halftone exposure but may be any two step exposure to reduce the thickness of a part of the resist film. Specifically, immediately after the development, portions where the resist film is removed, the resist film is remained and the resist film thickness become thinner may be formed. Therefore, the exposure process may be any two step exposure to have two levels of the Film thickness. For example a gray tone exposure may be used.

Next, the second insulating film 7 is formed by plasma CVD method or the like. For the second insulating film 7, same material as the first insulating film 3 can be used. Further, the thickness of the second insulating film 7 is preferably determined in light of a coverage of lower layer pattern. In this embodiment, a SiN film having a film thickness of 300 nm is formed as the second insulating film 7.

Next, the second insulating film 7 is patterned by a forth photomechanical process. This creates the configuration shown in FIGS. 4C and 5C. In this process, the contact hole 81 is formed on the reflective pixel electrode 65. Further, the contact hole 82 is formed on the auxiliary capacity electrode 23. The second insulating film 7 may be etched by a wet etching method using a known etchant or a dry etching method using a known gas composition.

Then the third conductive film is formed by the sputtering method. Thus the third conductive film is formed over the second insulating film 7 having the contact holes 81 and 82 formed therein. For the third conductive film, a transparent conductive film such as ITO, IZO, ITZO and $SnO_2$ may be used, for example. In this embodiment, 80 nm ITO is used as the third conductive film.

Next, the third conductive film is patterned by a fifth photomechanical process. This creates the configuration shown in FIGS. 4D and 5D. In this process, the transparent pixel electrode 91 and transparent common electrode 92 are formed in the transparent region T. Further in the reflector region S, the reflective common electrode 66 is formed. A part of the transparent pixel electrode 91 is buried in the contact hole 81. Accordingly the transparent pixel electrode 91 is connected with the reflective pixel electrode 65 via the contact hole 81. Further a part of the transparent common electrode 92 or the reflective common electrode 66 is buried in the contact hole 82. Thus the transparent common electrode 92 and reflective common electrode 66 are connected with the auxiliary capacity electrode 23 via the contact hole 82.

As set forth above, the array substrate 110 can be formed by 5 times of photomechanical processes. Thus the substrate 110 having the reflective pixel electrode 65 and transparent pixel electrode 91 in a pixel can be easily manufactured.

As described in the foregoing, the array substrate 110 having the TFT formed therein is coated with the alignment film by a cell fabrication process that follows. Further, the alignment film is rubbed in a predetermined direction. In this example it is rubbed in the direction indicated by the arrow in FIG. 2. Likewise, a color filter (CF) and BM or the like are formed over the transparent insulating substrate in the opposing substrate opposed to the array substrate 110. Over the CF and BM, a protective film is formed. Then the alignment film is coated over the protective film and rubbed.

A frame-shaped seal material is coated over the array substrate 110 or opposing substrate. The seal material is formed in the frame region 112 by using a dispenser, for example. After coating the seal material, the array substrate 110 and opposing substrate are overlapped via a spacer. In this example, the alignment film of the array substrate 110 and that of the opposing film is overlapped to face each other. Liquid crystal is filled between the pair of overlapped substrate and then sealed. The polarization plate and retardation plate are attached to both outside sides of the liquid crystal cell formed as described above. After that, the backlight unit is mounted to a backside thereof. A transflective liquid crystal display is completed.

Further, a gap control layer for controlling a cell gap between the transparent region T and the reflector region S may be provided. The gap control layer may be formed in the opposing substrate, for example. The gap control layer may be formed in the region opposed to the reflector region S of the array substrate 110. An organic transparent film may be used for the gap control layer. Note that the gap control layer may be formed in the array substrate 110 or in both of the substrates. By forming the gap control layer, the thickness of the liquid crystal layer in the reflector region S may be thinner than the thickness of the liquid crystal layer in the transparent region T. Therefore the electro-optic properties of the transparent region T and reflector region S can be easily agreed.

Figure 6:
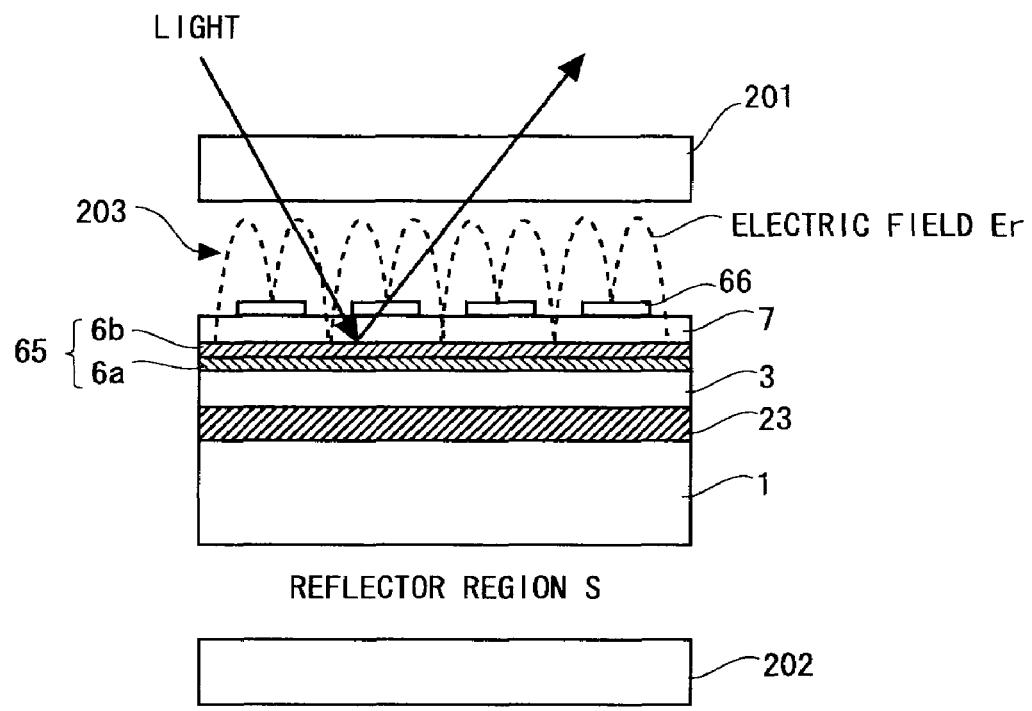
FIG. 6 is a cross-sectional diagram showing an operation of a reflector region of a liquid crystal display according to the first embodiment of the present invention.
Figure 7:
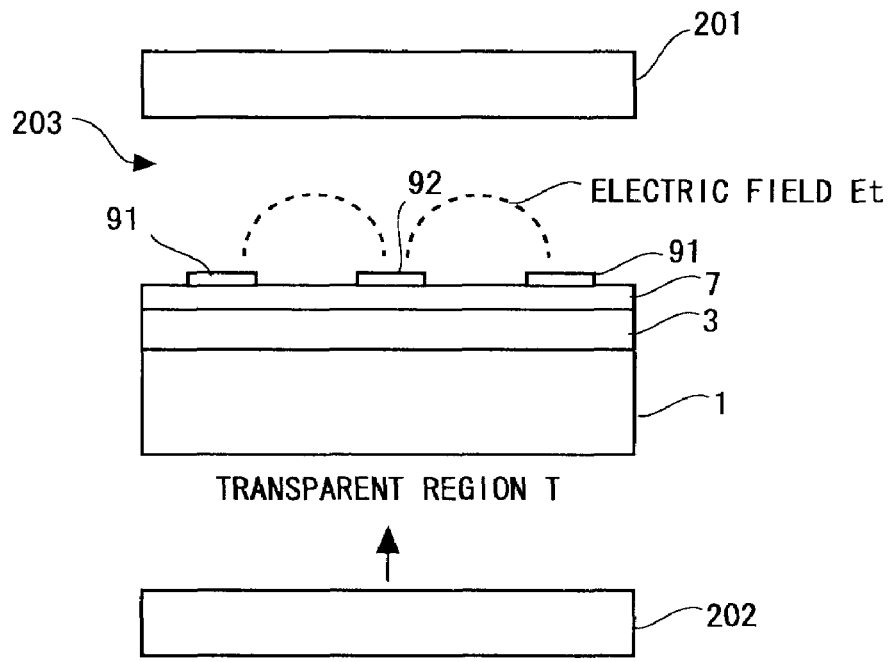
FIG. 7 is a cross-sectional diagram showing an operation of a transparent region of a liquid crystal display according to the first embodiment of the present invention.

An operation of the liquid crystal or the like is described hereinafter in detail with reference to FIGS. 6 and 7. FIG. 6 is a cross-sectional diagram showing the configuration of the reflector region S. FIG. 7 is a cross-sectional diagram showing the configuration of the transparent region T. In FIGS. 6 and 7, the configurations of the alignment film and color filter or the like are not illustrated. 201 refers to the opposing substrate, 202 refers to the backlight unit and 203 refers to the liquid crystal layer. Further in FIGS. 6 and 7, the side of the opposing substrate 201 is the visible side.

An operation of the reflector region S is described hereinafter with reference to FIG. 6. As shown in FIG. 6, the reflective common electrode 66 is formed in the upper layer of the reflective pixel electrode 65 where the drain electrode 62 of the TFT is extended. The second insulating film 7 is formed between the reflective pixel electrode 65 and reflective common electrode 66. Accordingly the reflective common electrode 66 that is formed in slit shape overlaps the reflective pixel electrode 65. The reflective pixel electrode 65 is formed by a metallic film having a high reflectivity. Further, the reflective common electrode 66 is formed by a transparent conductive film having a high light transmission. Thus the outside light entered from the visible side to the reflector region S transmits the reflective common electrode 66 or the like and enters the reflective pixel electrode 65. Further, the outside light entered to the reflective pixel electrode 65 is reflected at the surface of the reflective pixel electrode 65 and output to the visible side. The reflective pixel electrode 65 is formed to almost the whole surface of the reflector region S. Accordingly almost all the outside light entered in the reflector region S can be reflected. Note that the auxiliary capacity electrode 23 and the reflective pixel electrode 65 are overlapped with the first insulating film 3 interposed therebetween.

The driving of the liquid crystal in the reflector region S is described hereinafter in detail. When a potential is applied to the reflective pixel electrode 65 and the reflective common electrode 66, an electric field is generated by a potential difference between them. The electric field generates a fringe electric field Er in oblique direction in the slit portion. In the slit portion provided by opening the reflective common electrode 66, the fringe electric field Er oblique to the substrate 1 surface is generated. The liquid crystal is driven by the fringe electric field Er. In this example, as the second insulating film 7 is several hundreds nm (300 nm in this embodiment), the generated fringe electric field Er is extremely strong.

The electrode width and electrode interval of the reflective common electrode 66 that is processed in slit shape may be relatively small values for example 3 μm to 6 μm. The electric field is impressed to the liquid crystal molecule above the electrode and between the electrodes. Specifically in the almost the whole surface of the reflective pixel electrode 65, the alignment direction of the liquid crystal molecule can be controlled. Therefore, the problem of IPS method that the electric field hard to be applied to liquid crystal molecules on the electrode can be improved. Thus the liquid crystal can be driven in almost the whole surface over the reflective pixel electrode 65. This improves the reflective brightness, thereby improving the display quality.

As set forth above, in the liquid crystal display of this embodiment, light can be reflected at almost the whole surface of the reflector region S. Furthermore, the liquid crystal of almost the whole surface of the reflector region S can be controlled. Specifically in the almost the whole surface of the reflector region S, the alignment direction of the liquid crystal can be changed. Thus the reflective brightness can be improved. As the principle of operation in the reflector region S is almost same as FFS method, a wide viewing angle can be obtained in the reflective display. Accordingly a favorable display quality can be obtained in the reflective display, thereby improving the display quality.

As shown in FIG. 2, the direction of the slits of the reflective common electrode 66 is tilted from the rubbing direction. Here, the angle made by the slit and rubbing direction of the reflective common electrode can be θ1. Specifically, the rubbing direction is set to a direction tilted by θ1 from the slit direction. The value of θ1 is a parameter that influences the liquid crystal drive voltage. Thus the value of θ1 is set in consideration of the liquid crystal to be used and the relationship of the design parameter of the optical axis of the polarizing and retardation plates. Then it is possible to configure so that the voltage transmission properties is close to that of the transparent region T. Thus the display quality can be improved.

An operation in the transparent region T is described hereinafter in detail with reference to FIG. 7. In the transparent region T, the transparent pixel electrode 91 and transparent common electrode 92 are placed alternately in a single layer. Then the liquid crystal is driven by a horizontal electric field Et generated between the transparent pixel electrode 91 and transparent common electrode 92. Specifically, it is same as the operation in IPS method. In the transparent region T, the light from the backlight unit 202 transmits the liquid crystal layer 203 and opposing substrate 201. The light is output to the visible side by this. Accordingly by the transparent display, a favorable display quality having a wide viewing angle can be achieved. Note that as shown in FIG. 2, the longitudinal direction of the transparent common electrode 92 and transparent pixel electrode 91 is set to be tilted toward the rubbing direction by the predetermined angle θ2. Specifically, the angle made by the direction in which each comb electrode is provided and rubbing direction is θ2.

The value of θ2 is a parameter that influences the liquid crystal drive voltage. Accordingly the value of θ2 is set in consideration of the liquid crystal to be used and the relationship of the design parameter of the optical axis of the polarizing and retardation plates. Then it is possible to configure so that the voltage transmission properties is close to that of the reflector region S. In this example the values of θ1 and θ2 are set to be different values. Thus the display quality can be improved. Specifically, the direction of the comb electrode of the transparent pixel electrode 91 and the slit direction of the reflective common electrode 66 is set to be tilted by a predetermined angle. The values of θ1 and θ2 may be the same value. That is, the direction of the comb electrode of the transparent pixel electrode 91 and the slit direction of the reflective common electrode 66 may be parallel to each other.

As described in the foregoing, the reflective pixel electrode 65 is the drain electrode 62 being extended. Specifically the drain electrode 62 and reflective pixel electrode 65 is formed by the same second conductive film and patterned together. Further, the reflective common electrode 66, transparent pixel electrode 91 and transparent common electrode 92 are formed by the same third conductive film. Accordingly it is possible to produce with the same number of manufacturing processes as compared to a conventional transflective liquid crystal display. Thus a new manufacturing process is not required to be added in the array process of the transflective liquid crystal display. This prevents from complicating the manufacturing process, thereby improving productivity.

As described in the foregoing, in the transflective liquid crystal display of this embodiment, in the reflector region S, the liquid crystal can be driven using the oblique electric field generated on the substrate. Further in the transparent region T, the liquid crystal can be driven using the horizontal electric field generated on the substrate. Thus a favorable display characteristic can be obtained.

Further, the reflective pixel electrode 65 is the drain electrode 62 being extended. Further, the reflective common electrode 66, transparent pixel electrode 91 and transparent common electrode 92 are formed by the same third conductive film. Thus a special manufacturing process needs not to be added as compared to the manufacturing process of a conventional transflective liquid crystal display. Thus the productivity can be improved. As almost all the regions between the source lines 63 are covered with the reflective common electrode 66 and transparent common electrode 92, the electric field between the source lines 63 can be effectively blocked. Thus the light efficiency can be improved and the liquid crystal display with high brightness can be achieved. By having the above-mentioned pixel structure, the number of manufacturing process can be prevented to increase. Thus the productivity can be improved.

As described in the foregoing, with the liquid crystal display of this embodiment, it is possible to achieve the display quality having high transmission and reflectivity. Further, as the number of manufacturing process is not increased, the production of high yield ratio and low cost can be conducted. Thus a liquid crystal display panel having a simple configuration and with wide viewing angle can be manufactured. Thus a liquid crystal display having excellent mass productivity can be achieved with low cost.

Second Embodiment

Figure 8:
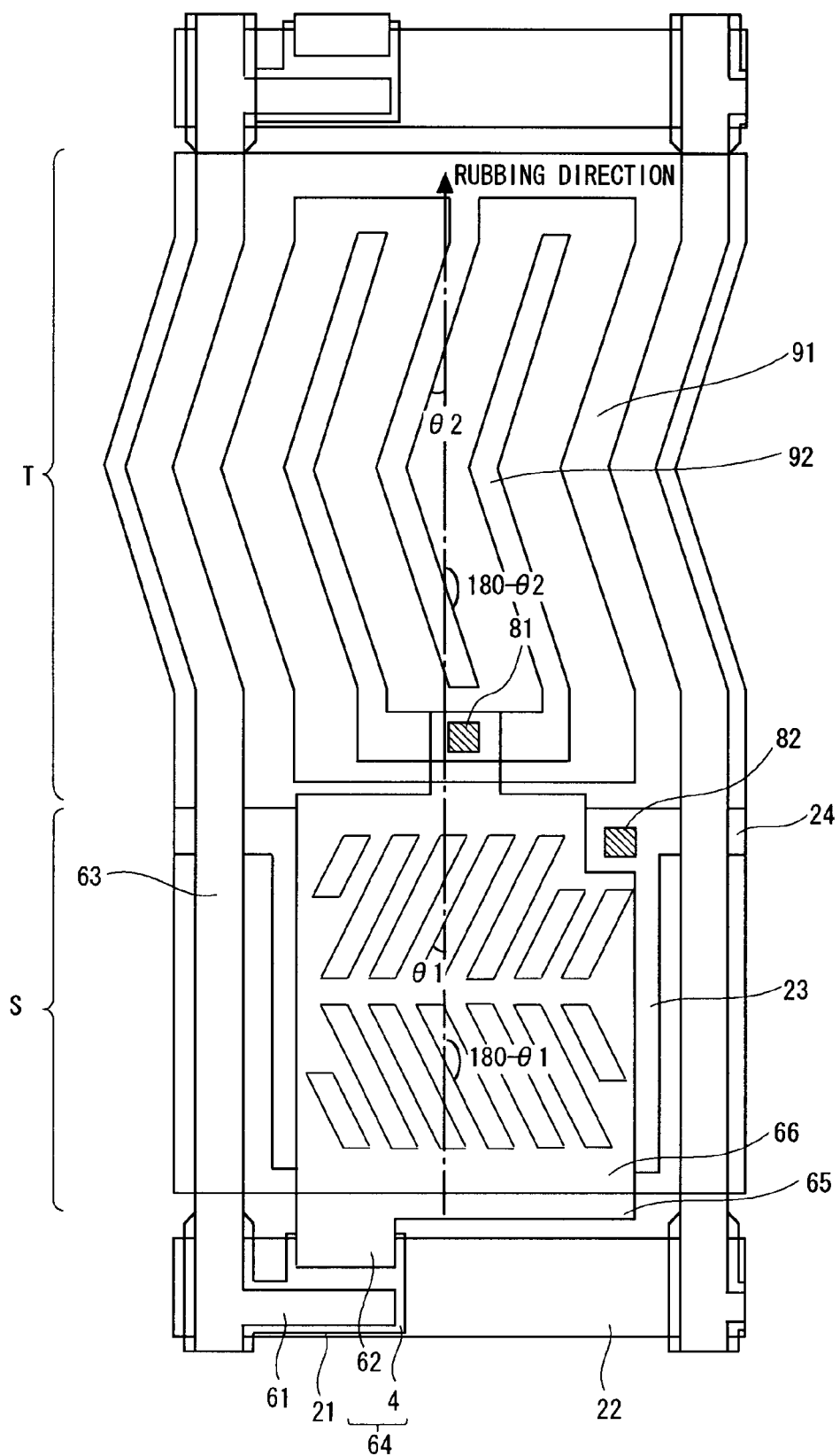
FIG. 8 is a plan view schematically showing a pixel configuration of a TFT according to a second embodiment of the present invention.

The configuration of a liquid crystal display of this embodiment is described hereinafter in detail with reference to FIG. 8. FIG. 8 is a plan view showing a pixel configuration of a TFT array substrate used in a liquid crystal display of this embodiment. In this embodiment, the shape of the electrodes of the configuration of the first embodiment is changed and multi-domained. Accordingly the basic configuration, manufacturing method and operational method are same as the first embodiment.

Specifically, in the reflector region S, slits of the reflective pixel electrode 65 are of two lines. The direction of the slits differ by each line. Specifically, two lines of slits are placed side by side between the adjacent source lines 63. Further for each line, 7 slits are provided aligned in the direction of the gate line 22. Further the slit lines are formed aligned in the direction of the source line 63. In this example, the two lines of slits are placed inverted to the linear lines parallel to the gate line 22 in between them.

In the two lines of slits, in the line of the drain electrode 62 side, the angle made by the rubbing and slit directions is 180-θ1. In the other line, the angle made by the rubbing and slit directions is θ1. As set forth above, the slit direction is two different angles to the rubbing direction. The reflector region S can be multi-domained by this. The angle of θ1 may be determined in consideration of the design parameter. To form the abovementioned slits, the opening is created in the reflective common electrode 66. As with the first embodiment, an oblique electric field is generated. Here in this embodiment, a direction orthogonal to the gate line 22 is the rubbing direction.

Further in the transparent region T, bending portion is provided to each comb electrode of the transparent common electrode 92 and transparent pixel electrode 91. That is, each comb electrode of the transparent common electrode 92 and transparent pixel electrode 91 is bent akimbo. Accordingly the transparent pixel electrode 91 and the transparent common electrode 92 are inverted to the linear lines parallel to the gate line 22 near central portion of them.

The direction of the comb electrode of the transparent common electrode 92 and transparent pixel electrode 91 is two different angles for the rubbing direction. This enables the transparent region T to be multi-domained. Among the transparent pixel electrode 91 and transparent common electrode 92, the angle made by the portion of the auxiliary capacity line 24 side and rubbing direction is 180-θ2. On the other hand, among the transparent pixel electrode 91 and transparent common electrode 92, the angle made by the portion of the adjacent gate line 22 side and rubbing direction is θ2. Further in this example, a part of the source line 62 is bent akimbo in accordance with the shape of the comb electrode of the transparent common electrode 92 and transparent pixel electrode 91.

The initial alignment direction of the liquid crystal molecules is determined by the rubbing direction. Thus by having the abovementioned configuration, the direction of the electric field for the initial alignment direction of the liquid crystal becomes two directions in both of the reflector region S and transparent region T in one pixel. That is, the direction of the horizontal electric field can be of two kinds in both of the reflector region S and transparent region T. This creates regions having different rotation directions for the liquid crystal. Accordingly an asymmetry of the viewing angle properties caused by the reflective anisotropy of the liquid crystal molecules can be compensated.

Note that only the transparent region T can be multi-domained, or only the reflector region S can be multi-domained. This improves the display quality of the transparent region T or reflector region S.

Third Embodiment

Figure 9:
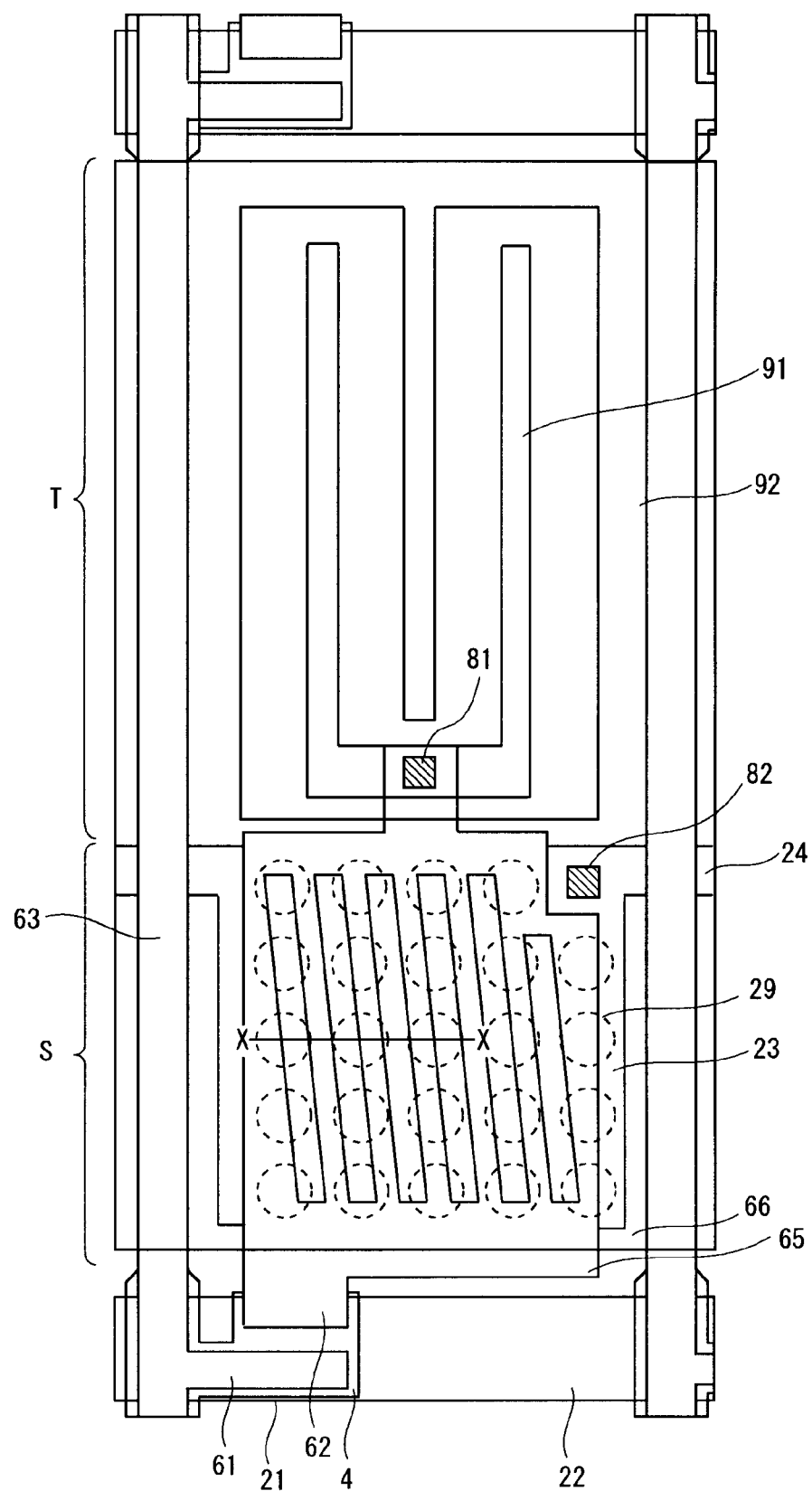
FIG. 9 is a plan view schematically showing a pixel configuration of a TFT according to a third embodiment of the present invention.
Figure 10:
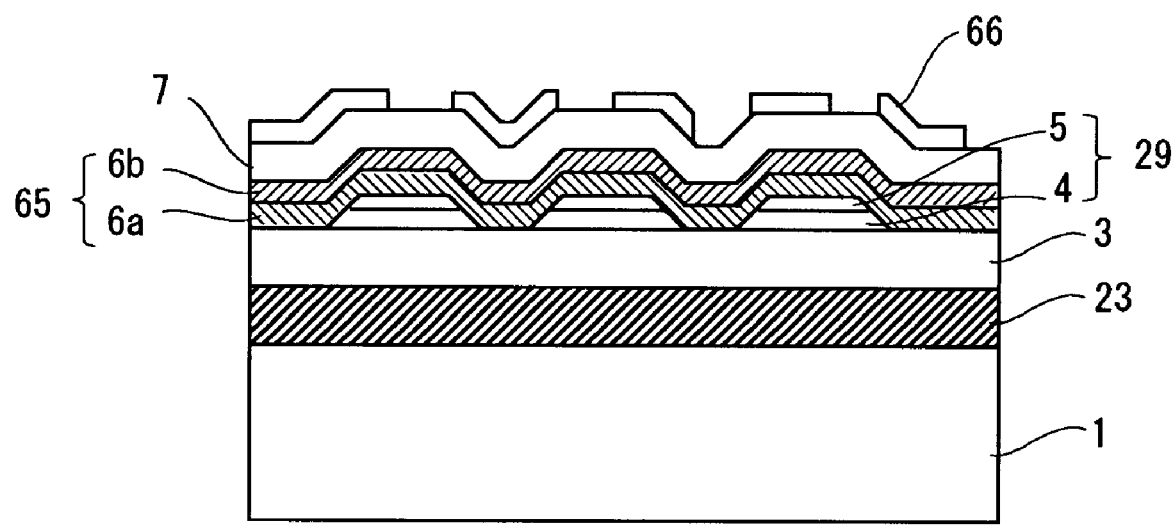
FIG. 10 is a cross-sectional diagram schematically showing a pixel configuration of the TFT according to the third embodiment of the present invention.

A liquid crystal display of this embodiment is described hereinafter in detail with reference to FIGS. 9 and 10. FIGS. 9 and 10 are plan views showing pixel configurations of TFT array substrates used in a liquid crystal display of this embodiment. FIG. 10 is a cross-sectional diagram taken along the line X-X of FIG. 9. In this embodiment, the light-scattering properties of the reflector region S is improved for the configuration of the first embodiment. Accordingly the basic configuration, manufacturing method and operational method are same as the first embodiment.

As shown in FIGS. 9 and 10, a scattering pattern 29 is formed in the reflector region S. The difference from the first embodiment is the scattering pattern 29. The scattering pattern 29 is formed below the reflective pixel electrode 65. Specifically, the scattering pattern 29 is constituted by the semiconductor active film 4 and ohmic contact film 5. Then the scattering pattern 29 is provided in a part of the reflective pixel electrode 65. That is, in the reflector region S, the patterning is performed so that a part of the semiconductor active film 4 and ohmic contact film 5 remain above the first insulating film 3. This creates a plurality of island shaped scattering patterns 29 are formed below the reflective pixel electrode 65.

Accordingly convexo-concave is formed at a foundation layer of the reflective pixel electrode 65. That is, the reflective pixel electrode 65 is formed over the convexo-concave shape. In other words, the height of the foundation layer of the reflective pixel electrode 65 changes by whether or not the scattering pattern 29 exists or not. This reduces the flatness of the surface of the reflective pixel electrode 65. It further scatters the light reflected at the surface of the reflective pixel electrode 65. Thus the light-scattering properties and the display quality can be improved. The scattering pattern 29 is formed by a second photomechanical process. This prevents from increasing the manufacturing processes. Thus the display quality can be improved without reducing productivity.

Figure 11:
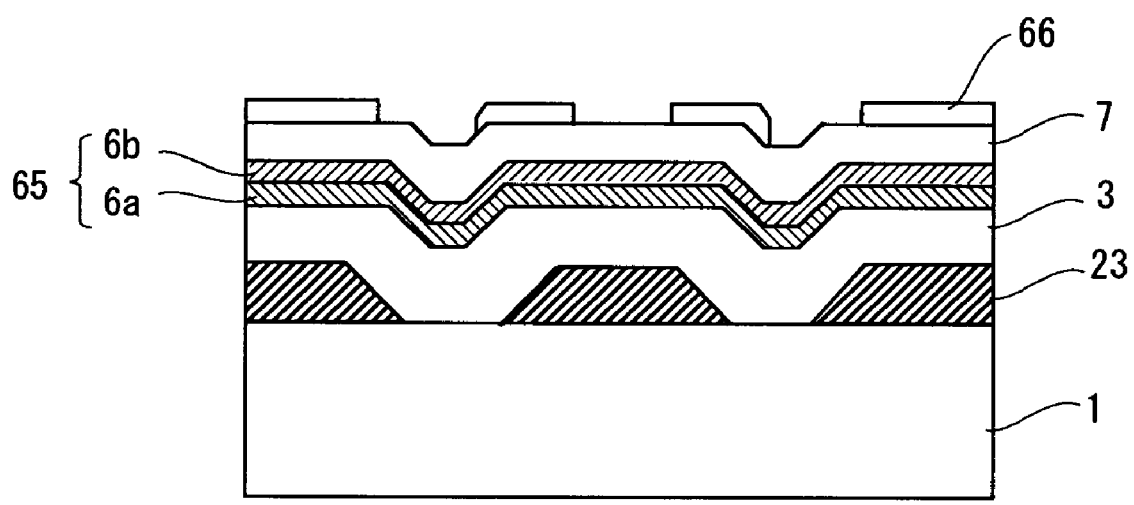
FIG. 11 is a cross-sectional diagram schematically showing another pixel configuration of the TFT according to the third embodiment of the present invention.

Here the scattering pattern 29 is formed to create convexo-concave shape on the surface of the reflective pixel electrode 65. A thin film other than the semiconductor active film 4 and ohmic contact film 5 may be used for the scattering pattern 29. That is, the scattering pattern 29 can be formed using other metallic film, inorganic insulating film and organic insulating film. As shown in FIG. 11, identical effects can be achieved when using the auxiliary capacity electrode 23. Therefore, by providing convexo-concave shape at the foundation film of the reflective pixel electrode 65, the light-scattering properties can be improved. That is, convexo-concave shape may be formed at the foundation. Needless to say that the convexo-concave shape can be formed by removing only a part of the foundation film in the film thickness direction. Further, the convexo-concave shape may be formed by patterning the foundation film to be small island-shaped pattern. This improves light-scattering properties. Thus the display quality of the reflector region S can be improved. Note that this embodiment may be combined with the second embodiment.

Fourth Embodiment

Figure 12:
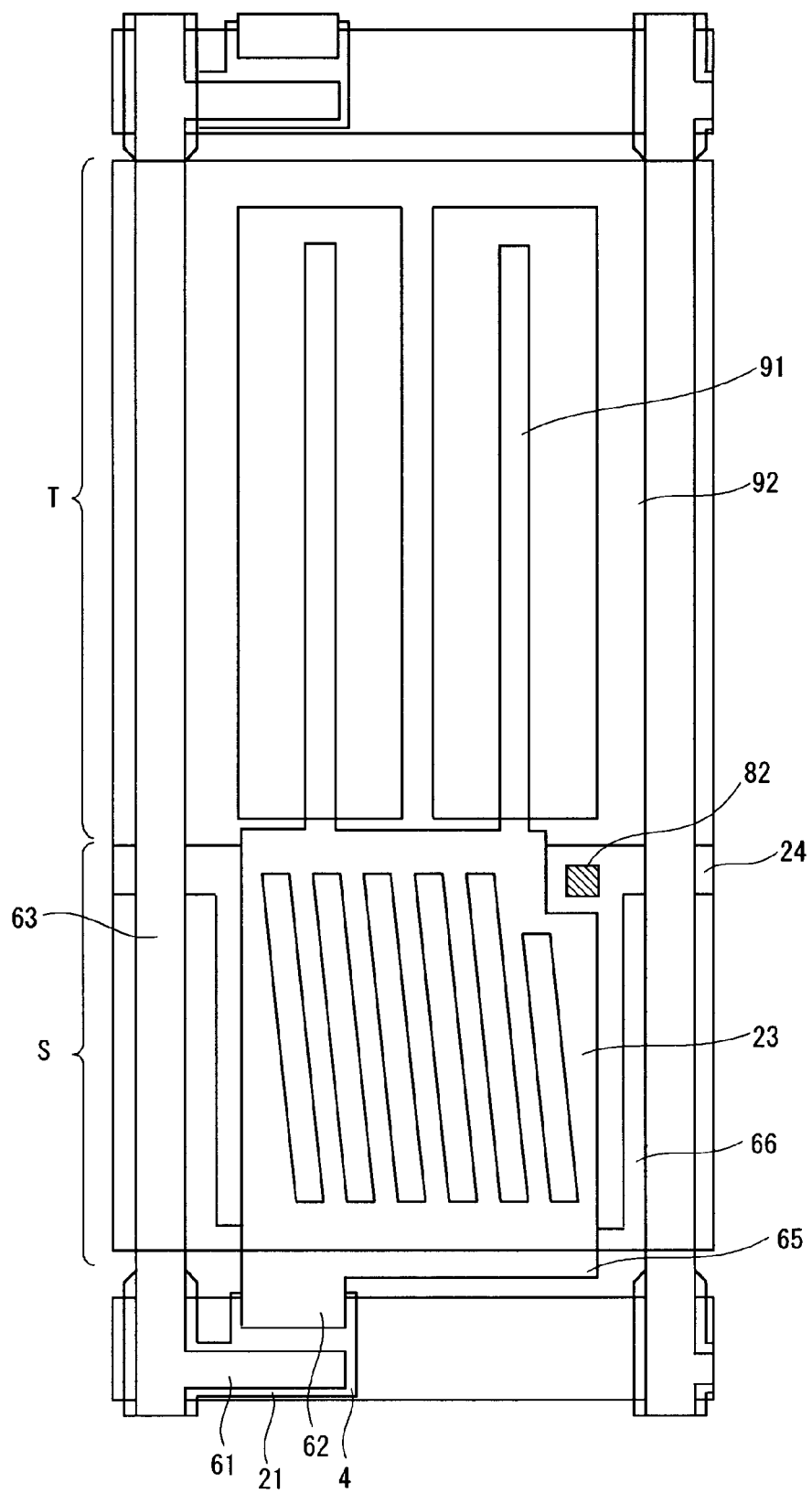
FIG. 12 is a plan view schematically showing a pixel configuration of a TFT according to a fourth embodiment of the present invention.

A liquid crystal display of this embodiment is described hereinafter in detail with reference to FIG. 12. FIG. 12 is a plan view showing a pixel configuration of a TFT array substrate used in the liquid crystal display of this embodiment. In this embodiment, the reflective pixel electrode 65 is extended to form the transparent pixel electrode 91. Specifically, the reflective pixel electrode 65 and the transparent pixel electrode 91 are formed integrated by the second conductive film. Accordingly the basic configuration, manufacturing method and operational method are same as the first embodiment.

Here the reflective pixel electrode 65 and the transparent pixel electrode 91 are formed of the second conductive film. This eliminates the need for the contact hole 81 that connects the reflective pixel electrode 65 and transparent pixel electrode 91, thus improving the aperture ratio. That is, the region where the contact hole 81 is formed in the first embodiment can be used for transparent display. Needless to say that this region can be used for reflective display. The display quality is improved by this. This embodiment is especially effective in light of the improvement of the aperture ratio in case the size of the pixel is small. The reflective pixel electrode 65 and transparent pixel electrode 91 are formed integrally. Thus the voltage reduction caused by the contact resistance in the contact hole can be reduced. This embodiment may be combined with the second and third embodiments.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display comprising:
    a liquid crystal layer held between a first and a second substrate, the first and the second substrate being placed opposite to each other; and
    a reflector region and a transparent region in one pixel, wherein the first substrate comprises:
    a comb-like transparent common electrode provided in the transparent region;
    a comb-like transparent pixel electrode placed opposed in parallel to the transparent common electrode and for generating a horizontal direction electric field between the transparent common electrode in the transparent region;
    a reflective common electrode provided in the reflector region; and
    a reflective pixel electrode provided in the reflector region and placed opposed to the reflective common electrode with an insulating film interposed therebetween,
    wherein between the reflective common electrode and the reflective pixel electrode, a slit is formed in the electrode provided to an upper layer, and
    an oblique electric field is generated between the reflective common electrode and reflective pixel electrode by the slit.

2. The liquid crystal display according to claim 1, wherein the reflective common electrode is formed in an upper layer of the reflective pixel electrode, and
    an angle to a rubbing direction toward a direction the slit of the reflective common electrode is provided and an angle to the rubbing direction toward a direction a comb of the comb-like transparent pixel electrode is provided are different.

3. The liquid crystal display according to claim 1, wherein the reflective common electrode is formed by a transparent conductive film,
    the reflective pixel electrode is placed in a lower layer of the reflective common electrode with the insulating film interposed therebetween, and
    a surface of the reflective pixel electrode is formed by a metallic film.

4. The liquid crystal display according to claim 1, wherein the reflective pixel electrode is extended from an electrode of a switching device provided to the pixel.

5. The liquid crystal display according to claim 4, wherein the transparent pixel electrode is connected to the switching device via the reflective pixel electrode.

6. The liquid crystal display according to claim 1, wherein the transparent common electrode and the reflective common electrode are formed by a same material.

7. The liquid crystal display according to claim 6, wherein the transparent common electrode and the reflective common electrode are formed by a same transparent conductive film.

8. The liquid crystal display according to claim 6, wherein the transparent pixel electrode is formed by the same material as the transparent common electrode and reflective common electrode.

9. The liquid crystal display according to claim 1, wherein the transparent common electrode and the reflective common electrode are connected to an auxiliary capacity electrode via a contact hole provided in the pixel.

10. The liquid crystal display according to claim 1, wherein in the reflector region, the reflective common electrode is extended to overlap lines provided to both sides of the pixel with the insulating film interposed therebetween.

11. The liquid crystal display according to claim 1, wherein in the transparent region, the transparent common electrode is extended to overlap lines provided to both sides of the pixel with the insulating film interposed therebetween.

12. The liquid crystal display according to claim 1, wherein the reflective pixel electrode is a laminated structure having at least an upper and a lower layers, and
    in a contact hole for connecting the reflective pixel electrode and the transparent pixel electrode, the upper layer of the reflective pixel electrode is removed and the lower layer is exposed.

13. The liquid crystal display according to claim 1, wherein either or both of the reflector and transparent region is multi-domained.

14. The liquid crystal display according to claim 1, wherein a convexo-concave shape is formed at a foundation film of the reflective pixel electrode.

15. The liquid crystal display according to claim 14, wherein the convexo-concave shape is formed of a semiconductor or a metallic film.

16. A method of manufacturing a liquid crystal display having a liquid crystal layer held between a first and a second substrate disposed opposite to each other, a reflector and transparent regions in one pixel, the method comprising:
    forming a first line with a first conductive film provided over the first substrate;
    forming a first insulating film and a semiconductor film over the first line;
    forming a reflective pixel electrode and a second line with a second conductive film provided over the first insulating film and the semiconductor film, the second line being orthogonal to the first line with the first insulating film interposed therebetween, the reflective pixel electrode having a slit in the reflector region;
    forming a second insulating film over the second line and the second reflective pixel electrode; and
    forming a comb-like transparent common electrode provided in the transparent region and a reflective common electrode provided in the reflector region by a third conductive film over the second insulating film,
    wherein in the transparent region, the transparent common electrode is patterned so that a comb-like transparent pixel electrode formed by the second or the third conductive film is placed opposed parallel to the transparent common electrode and an horizontal electric field is generated between the transparent pixel electrode and the transparent common electrode, and
    in the reflector region, the reflective common electrode is patterned so that an oblique electric field is generated between the reflective pixel electrode and the reflective common electrode by the slit provided in the reflective pixel electrode.

17. The method according to claim 16, wherein
    the transparent pixel electrode is formed by the third conductive film,
    in the formation of the second insulating film, a contact hole to the transparent pixel electrode is formed in the pixel, and
    the transparent pixel electrode and reflective pixel electrode is connected via the contact hole.

18. The method according to claim 16, wherein the patterning is made so that a direction of a comb of the comb-like transparent pixel electrode and a direction of the slit of the reflective pixel electrode are different.

* * * * *